United States Patent [19]

Freeland

[11] Patent Number: 5,130,404

[45] Date of Patent: Jul. 14, 1992

[54] CASTABLE THERMOSETTING POLYURETHANE POLYMER HAVING IMPROVED HEAT STABILITY

[75] Inventor: Gerard S. Freeland, Lawton, Mich.

[73] Assignee: Azon USA Inc., Kalamazoo, Mich.

[21] Appl. No.: 710,114

[22] Filed: Jun. 4, 1991

[51] Int. Cl.$^5$ .............................................. C08G 18/32
[52] U.S. Cl. ......................................... 528/52; 528/53; 528/54; 528/55; 528/76; 528/77
[58] Field of Search .................... 528/52, 53, 76, 77, 528/54, 55

[56] References Cited

U.S. PATENT DOCUMENTS 4,010,146  3/1977  Russell et al. ........................ 528/77

*Primary Examiner*—Maurice J. Welsh
*Attorney, Agent, or Firm*—Gordon W. Hueschen

[57] ABSTRACT

A castable thermosetting polyurethane polymer, having improved heat-stability characteristics, comprising (A) a polymeric methylene diisocyanate, (B) a propyleneoxide-extended polyol which is preferably a sugar-based polyol, (C) a polyether diol or triol, and (D) dipropylene glycol or diethylene glycol, in amounts respectively between about 35–45 parts by weight, 35–45 parts by weight, and 12–20 parts by weight, per 100 parts by weight of total diol and triol (resin) components, providing an NCO/OH ratio between about 1:1 and about 1.2:1, an effective polyurethane-catalyzing amount of (E) a urethane catalyst, and optionally comprising an effective amount of a drying agent, is disclosed. The cast polyurethane polymer of the invention withstands temperatures of 450° F. (232° C.) for 20 minutes without visual polymer degradation, whereas most other castable polyurethane systems degrade between 350° F. and 375° F., as a result of which heat-stability the polymer of the present invention is especially suitable for post finishing which involves the employment of higher temperatures, such as painting with thermosetting coatings, powder coating, and anodizing.

22 Claims, No Drawings

CASTABLE THERMOSETTING POLYURETHANE POLYMER HAVING IMPROVED HEAT STABILITY

BACKGROUND OF THE INVENTION

1. Field of the Invention

Castable and curable thermosetting polyurethane polymers; such polymers having improved heat stability.

2. Prior Art

The prior art is replete with castable thermosetting polyurethane polymers of various compositions, and numerous are available in commerce. The systems employed vary from product to product and provide varying properties or characteristics as may be desired in their end use. The castable urethane polymers are used in a wide range of molded products, as is well known in the art. However, when used as a structural component, as an insulating medium in a thermalized (thermal barrier) aluminum extrusion window or door frame, or the like, the available materials have been found to be characterized by various shortcomings which limit their applicability and especially their performance and acceptability in use. In particular, since castable elastomers may in use be subjected to elevated temperatures such as encountered during post finishing, e.g., painting with thermosetting materials including high-temperature thermosetting paints, powder coatings, and anodizings, degradation at such higher temperatures which are encountered in such end use seriously detract from their performance, acceptability, and suitability in actual use. Up to the present, such shortcomings have presented not only a limitation upon the end use of such polyurethane polymers but has also resulted in the development of disadvantageous characteristics when the high-temperature finishing of an end product, commonly referred to as post finishing, has been attempted with conventional or commonly-available castable thermosetting polyurethane polymers. The present development is based upon the selection of a particular polyol and diol resin blend which imparts desirable high-temperature performance characteristics to the castable thermosetting polyurethane polymer of the present invention.

A search conducted according to the USPTO Automated Patent Searching system in Class 264, Subclasses 272.11, 331.12, and 331.16, as well as in Class 428, Subclass 34 and in Class 528, Subclass 73, failed to reveal previous patent literature considered to be even reasonably close to the present development, and a search of the APS full-text data base was also unproductive.

THE PRODUCT OF THE PRESENT INVENTION IN GENERAL

The castable and curable thermosetting polyurethane polymer of the present invention has numerous advantages over existing competitive systems which have become known to the inventor. It finds general use in molded products. Most molded plastics, molded in usual open or injection molds, or extruded into cavities by "cavity extrusion", for example, into a cavity in a window frame, must be painted with low-temperature curable paints and cannot withstand powder coating or other treatment, such as anodizing, due to the high cure temperatures which are involved in such cases. The product of the invention, on the other hand, can withstand the temperatures necessarily involved in powder coating or anodizing and can be painted with higher-temperature curable paints, which are generally advantageous because they are more durable. Moreover, the product of the invention may, if desired, be treated with a dip coating, allowing it to be electrostatically coated at the higher temperatures involved in such procedures. The higher temperatures which the product of the present invention can withstand extend all the way up to 450° F. for 20 minutes or more, as will be further pointed out hereinafter.

The thermally-stable polyurethane polymer of the present invention is constructed from a carefully selected combination of commercially-available reagents, and the invention comprises the utilization of these components, which are of course old in themselves, in such a manner as to produce the final end product, the castable and curable thermosetting polyurethane polymer, which is ideal for pouring in place as a thermal barrier, which serves a purpose which is not attainable by or with previously-available products, and which, by its very definition, is unique in the field.

In particular, the polyurethane polymer of the invention, when employed as a structural component, most conveniently can serve as an insulating medium in a thermalized (thermal barrier) aluminum extrusion window or door frame. Such extrusions may be subjected to elevated temperatures, well above the normal range suitable for presently-available polyurethane polymers, which degrade at higher temperatures during post finishing, such as painting with thermosetting coatings including powder coating and anodizing or even high-temperature setting paints.

Thus, the present invention provides a castable polyurethane polymer which may be employed in a wide range of molded products, such as mechanical components which are subject to corrosive environments at elevated temperatures. It can be painted and may be used for decorative purposes and for end products which are cast molded. It is also unique because its properties can be achieved without the addition of fillers and fibers and because it may conveniently be dispensed through conventional low-cost, low-pressure, plural component metering mixing machines.

The product of the invention has a well established market in the thermalized or thermal barrier aluminum extrusion window and door frame market, and in like applications, because there is a growing need and desire on the part of producers of such items to post finish them after applying or introducing a thermal barrier polymer into a predetermined cavity therein, that is, the castable and curable thermosetting polyurethane polymer, by the application of thermosetting paints or powders, or by the medium of post anodization. The polymer of the present invention makes post finishing an option available to window and door manufacturers and to suppliers of thermal barrier window and door frames who are already employing conventional plural-component meter and mixing machines, since these are employed in prior art conventional methods using conventional polymers, which conventional and normal polyurethane polymers unfortunately degrade at the higher temperatures required for post finishing such as high-temperature painting, powder coating, and anodization. Using the conventional and generally-available equipment, however, but substituting the unique thermally-stable castable and curable thermosetting polyurethane polymer of the present invention, which is characterized by improved high-temperature stability, the art can readily adapt to the employment of the advantageous polymer of the present invention with its improved heat stability and accomplish all of the desirable effects of post finishing without degradation of the polyurethane polymer employed.

OBJECTS OF THE INVENTION

It is an object of the present invention to provide an improved castable and curable thermosetting polyurethane polymer, especially such type of polymer which is characterized by improved and advantageous heat stability. Another object of the invention is to provide such a castable and curable thermosetting polyurethane polymer which is adapted for higher-temperature post finishing procedures. A further object of the invention is the provision of such a polymer which is resistant to degradation at temperatures at which normally-available thermosetting polyurethane polymers degrade and which, therefore, is advantageously adapted to and suitable for the higher-temperature post finishing of articles containing the same and/or made therefrom. Still a further object of the invention is the provision of such a polymer which is made from a blend of components which may be dispensed for admixture together through conventional plural-component metering mixing machines and the like. Still another object of the invention is the provision of such a polymer which does not require the incorporation of fillers and/or fibers. Yet another object of the invention is the provision of such a polymer in which the elimination of water therefrom may be effected without the employment of a drying agent but which, advantageously, especially in certain applications, may comprise a drying agent. Yet an additional object of the invention is the provision of such a castable and curable thermosetting polyurethane polymer which has a heat distortron temperature above about 175° F. and which is able to withstand a temperature of 450° F. (232° C.) for at least 15 minutes, and preferably 20 minutes, without visual polymer degradation or degassing as determined from bubble emission or ebullition.

Still other objects will become apparent hereinafter, and still additional objects will be apparent to one skilled in the art to which this invention appertains.

SUMMARY OF THE INVENTION

The present invention, then, comprises the following aspects, inter alia. singly or in combination:

A thermosetting castable polyurethane polymer having improved heat-stability characteristics, comprising:

(A) a polymeric methylene diisocyanate having a functionality of at least about 2;

(B) a polyol having a molecular weight between about 300 and about 900 and an OH-functionality between about 3.0 and about 6.0;

(C) a polyether diol or triol having a molecular weight between about 500 and about 4000 and an OH-functionality between about 1.8 and about 3.2;

(D) a glycol selected from dipropylene glycol and diethylene glycol having a molecular weight between about 100 and 200 and an OH-functionality between about 1.8 and about 2.2;

said constituent diols and polyols being in the proportion of about 35 through about 45 parts by weight of (B), about 35 through about 45 parts by weight of (C), and about 12 through about 20 parts by weight of (D), per 100 parts by weight of all diol and polyol components, sometimes referred to herein as the "resin components" or "resin component";

(E) an effective polyurethane-catalyzing amount of a urethane catalyst; and (F) the isocyanate component (A) and combined diol and polyol components (B), (C), and (D), being in proportions so as to provide an NCO/OH ratio of at least about 1:1; such a castable polyurethane composition wherein the polyol (B) comprises an alkylene oxide extended polyol having a molecular weight between about 400 and 500 and a hydroxy number between about 300 and 450; such a castable polyurethane composition wherein the polyether diol or triol (C) has a molecular weight of about 750–1000 and a hydroxy number between about 100 and 150; such a castable polyurethane composition wherein (D) comprises dipropylene glycol; such a castable polyurethane composition wherein the polyol component (B) comprises a sugar-based alkylene oxide extended polyol; such a castable polyurethane composition wherein the polyol component (B) comprises an alkylene oxide extended alkyl glucoside; such a castable polyurethane composition wherein the polyol component (B) comprises a propylene oxide extended methyl glucoside having a molecular weight of about 446 and having a hydroxy number of about 440; such a castable polyurethane composition wherein the catalyst (E) comprises an amine catalyst; such a castable polyurethane composition wherein the catalyst (E) comprises a diamine catalyst; such a castable polyurethane composition wherein the NCO/OH ratio is between about 1:1 and about 1.2:1; such a castable polyurethane composition comprising an effective amount of a drying agent; such a castable polyurethane composition comprising a molecular sieve drying agent in an effective amount between about 1 and about 3 percent by weight of resin component; such a castable polyurethane composition wherein the drying agent comprises a zeolite; such a castable polyurethane composition wherein the polymeric diisocyanate comprises polymeric MDI (4,4'-diphenyl-dimethylene-diisocyanate); such a castable polyurethane composition wherein component (B) comprises a propylene oxide extended methyl glucoside having a molecular weight of about 446 and having a hydroxy number of about 440, component (C) comprises a polyether diol having a molecular weight of about 750–1000 and a hydroxy number of about 112, and component (D) comprises dipropylene glycol; such a castable polyurethane composition wherein the amount of component (B) is about 40–43 parts, the amount of component (C) is about 38–41 parts, and the amount of component (D) is about 15–17 parts, per 100 parts by weight of all diol and polyol components; such a castable polyurethane composition wherein component (A) comprises polymeric MDI (4,4'-diphenyl-dimethylenediisocyanate), the catalyst comprises a triethylene diamine catalyst, and the drying agent comprises a zeolite; such a castable polyurethane composition wherein the NCO/OH ratio is between about 1.05 and about 1.13:1; and finally such a poured and cured cast polyurethane composition, especially such a composition which is temperature stable in the ASTM D648 heat distortion test at a temperature of 180° F. and;

such a poured and cured cast polyurethane composition, especially such a composition which is temperature stable at a temperature of 450° F./232° C. for twenty minutes without visual degradation.

GENERAL DESCRIPTION OF THE INVENTION

The castable and curable thermosetting polyurethane polymer or elastomer of the invention, which exhibits improved heat-stability characteristics, comprises (A) a polymeric methylene diisocyanate (PMDI) having a functionality of at least about 2, preferably about 2.2 to 3.0, (B) a polyol having a hydroxy functionality between about 3.0 and about 6.0 and a molecular weight between about 300 and 900, (C) a polyether diol or triol having a hydroxy functionality between about 1.8 and 3.2 and a molecular weight between about 500 and 4000, and (D) a glycol selected from dipropylene glycol and diethylene glycol having a hydroxy functionality between about 1.8 and about 2.2 and a molecular weight between about 100 and 200. These components comprise the polyol and diol (or "resin") starting blend, and provide the active-hydrogen-containing starting materials for reaction with the isocyanate (A).

In the said blend, the first-named polyol (B) is present in a proportion of about 35 through about 45 parts, the polyether diol or triol (C) is present in a proportion of about 35 through about 45 parts, and the glycol (D) is present in a proportion of about 12 through about 20 parts, per 100 parts of all polyol components. Also included in the composition is an effective polyurethane-catalyzing amount of a urethane catalyst and, optionally, a drying agent, the isocyanate and the combined diol and polyol components being in proportions so as to provide an NCO/OH ratio between about 1:1 and about 1.2:1, this being normal for approximately stoichiometric proportions in the polyurethane field, and usually preferably between about 1.05 and 1.13:1. The drying agent, when present, is usually present in powder form in an amount between about 1% and 3% parts by weight of the resin blend, and is usually molecular sieve such as a Zeolite ™ or the like, preferably having a pore size of no greater than about three (3) Angstrom units, which is present for purposes of removing water. In the absence of a drying agent, a temporarily elevated temperature and vacuum may be employed for the same purpose. As to the amount of urethane catalyst, any effective urethane-catalyzing amount may be employed, and this amount is usually up to about 5%, e.g., between about 1% and about 5%, by weight of the resin component, as is conventional in the polyurethane art.

GENERAL CONSIDERATIONS

The Organic Polyisocyanate

Component (A), the organic isocyanate, advantageously comprises or consists essentially of a polymeric polyisocyanate PMDI, such polyisocyanates being poly(phenylene) poly(methylene)isocyanate (PAPI), also named poly (isocyanatophenylmethylene)phenyl isocyanate, produced by phosgenation of the reaction product of aniline with formaldehyde in acid media, or like polyisocyanates. The poly (phenylene)poly(methylene)isocyanates are disclosed, for example, in U.S. Pat. No. 3,916,060, and the preferred PMDI is polymeric MDI (4,4'-diphenyl-dimethylene-diisocyanate). These isocyanates generally have an isocyanate functionality of at least about 2 and generally between about 2.2 and 3.0. The diisocyanate is employed in approximately stoichiometric proportions with respect to the diol and polyol components, that is, as is conventional in this art, so as to give an NCO/OH ratio of at least about 1:1, usually between about 1:1 and about 1.2:1, preferably between about 1.05 and about 1.13:1. Mondur MR ® from Mobay and PAPI 27 or 135 from Dow are representatively suitable polyisocyanates.

The Polyol

The polyol component (B) has a molecular weight between about 300 and about 900 and an OH-functionality between about 3.0 and about 6.0 and is preferably a sugar-based polyol, preferably an alkyl glucoside-based polyol, most preferably a methyl glucoside-based polyol. The basic polyol molecule, whether sugar or otherwise, is extended with a sufficient number of alkylene oxide molecules, e.g., propylene oxide, ethylene oxide, or combinations of the two, to provide the desired molecular weight and hydroxy number. Suitable such polyols are commercially available, and the preferred polyol (B) is Olin-Poly-G ® 75-442, a propylene oxide extended methyl glucoside having a hydroxy number of about 440, a viscosity of about 5000, and a molecular weight of about 446, being a methyl glucoside extended with about 1.5 propylene oxide units per hydroxy group, and a hydroxy functionality of about 3.5. The exact functionality is reportedly due to the presence of another compound which is a co-initiator and which brings the functionality to about 3.5 instead of 4, as might be expected from the fact that methyl glucoside is a tetraol. The employment of this particular polyol gives unprecedented dimensional stability and temperature stability at elevated temperatures.

Other equivalent polyols may be employed, although none has been found as satisfactory as Olin-Poly-G ® 75-442, just previously described. Nearly equivalent polyols are Olin-Poly-G ® 75-300, Mobay Multrano ® E9118, E9136, and 4034; BASF-Wyandotte Pluracols ®, e.g., 824 (glycerol- or trimethylolpropane-based poly(oxypropylene)poly(oxyethylene) adducts); Reichhold Polylite ® 34-401, Dow Voranols ®, e.g., 490 (poly(oxypropylene) poly(oxyethylene) sucrose adducts); Texaco Thanol ® RS 490; and UCC Niax ® LS490, a polyoxypropylene extended sorbitol-based polyol, to name a few.

Of these competitive polyols, the Olin-Poly-G ® 75-300 is a methyl glucoside having a hydroxy functionality of 3.5 and an equivalent weight of 187. The hydroxy number is 300, and the molecular weight is 655. It is closely similar to Olin-Poly-G ® 75-442, being extended with 2.5 propylene oxide groups per hydroxy group.

The preferred polyol for employment in accord with the present invention is Olin-Poly-G ® 75-442 or its equivalent, followed closely by Olin-Poly-G ® 75-300, a methyl glucoside-based polyol extended with approximately 2.5 propylene oxide groups per hydroxy group, having a hydroxy functionality of about 3.5, an equivalent weight of about 187, a hydroxy number of about 300, and a molecular weight of 655, and by UCC Niax ® LS-490 or Texaco RS-490, which is a sorbitol-based polyester having a hydroxy number of 490, a hydroxy functionality of about 4, a molecular weight of about 458, and an equivalent weight of about 122.5.

The Polyetherdiol or Polyethertriol Component

The polyetherdiol or polyethertriol component (C) has a molecular weight between about 500 and about 4000 and an OH-functionality between about 1.8 and about 3.2. A polyetherdiol having a molecular weight of about 1000, an OH-functionality of about 2, and a hydroxy number of about 112 is especially well qualified as this component, and a commercially-available product known as Olin-Poly-G® 55-112 admirably suits these requirements. Olin-Poly-G® 85-36, a polyether triol containing 65-70% primary hydroxy groups, having an average molecular weight of 4,500, and a hydroxy number of 36, or Olin-Poly-G® 55-28, a polyether diol having more than 60 ethyleneoxide moieties and a hydroxy number of 28, may also be employed. Other competitive polyols may also be employed as component (C), for example, UCC Niax® diol PPG-725, a polyether diol having a molecular weight of about 760 and a hydroxy number of about 147 is suitable, as well as UCC Niax® polyether diol PPG-1025, a diol having a molecular weight of about 1000 and a hydroxy number of about 111, although the Poly-G® 55-112 is preferred. Another ethylene-oxide capped polyether diol suitable for use as diol component (B) is Fomrez® EPD-11, having a molecular weight of about 1000, a hydroxy number of about 112, and 0.05% water by weight (Witco Chemical Corporation).

The Glycol Component

As glycol component (D) is employed a diethylene glycol or dipropylene glycol, having a molecular weight between about 100 and about 200 and an OH-functionality between about 1.8 and about 2.2, with dipropylene glycol being preferred. Both diethylene glycol and dipropylene glycol are well-known commodities of commerce, and the dipropylene glycol available from The Dow Chemical Company is representative and entirely satisfactory.

The Catalyst

As effective polyurethane-catalyzing amount of a urethane catalyst (E) is preferably employed an amine catalyst, and diamine and especially triethylenediamine (TEDA) catalysts are particularly suitable. As such catalyst may be employed the Texacat® TD-33 or TD-33A catalysts (TEDA 33.3 wt. % solutions in propylene glycol and dipropylene glycol, respectively), or Texacat® DMDEE (2,2-dimorpholinodiethylether), from Texaco Chemical Company, or TD-20, N,N-dimethylethanolamine also from Texaco as well as the ZF-53 blend of TD-33A and ZF-22 (2,2-di(dimethylamino)-diethyl ether), again from Texaco, DABCO® R-8020, a blend of amine catalysts, i.e., crystalline triethylenediamine 20% and dimethylethanolamine 80% (Air Products), or DABCO 33-LV® catalyst comprising 33% triethylenediamine and 67% dipropylene glycol (DPG) (Air Products), or Polycat 8® (N,N-dimethylcyclohexylamine or DMCHA) from Air Products, or Polycat 77-50® (tertiaryamine, i.e., bis(dimethylaminopropyl)methylamine)/dipropyleneglycol) (Air Products), or Polycat 9® (tris-(3-dimethylamino)-propylamine) (Air Products), or TEDA (technically triethylenediamine or 1,4-diazobicyclo[2.2.2.]octane), a solid catalyst which must be dissolved in DPG or dimethylethanolamine (Focus Chemical Corp.), or UCC Niax® C-183, a mixture of dipropyleneglycol, triethylenediamine, and bis-(2-dimethylaminoethyl)-ether (Union Carbide).

The Drying Agent

The drying agent, when employed, is usually a molecular sieve, preferably of the zeolite type, and advantageously a zeolite in powder form having a pore size of no greater than about three (3) Angstrom units and, when employed, is ordinarily employed in an amount of about 1% to about 3% by weight of the combined polyol and diol components which, together with the drying agent and amine catalyst, is sometimes referred to herein as the "resin component". The molecule sieve powder, Purmol® 3ST, an alkali alumino silicate from Zeochem, has been found to be particularly useful. Zeolites are alkali alumino silicates, as well known in the art. When the pore diameters of such molecular sieve powders are 3 Angstrom units or less, the passages are sufficiently small so that no displaceable adsorbed gases are present therein. If larger pore diameter molecular sieves are employed, possibly-displaceable gases should be eliminated under vacuum before use to avoid possible bubbles and/or surface defects in the cast elastomer system.

THE METHOD IN GENERAL

A production resin blend is first prepared by admixing the polyether diol or triol (C), such as Olin-Poly-G® 55-112, with the polyol (B), such as the Olin-Poly-G® 75-442, and the dipropylene or diethylene glycol (D), and the drying agent, if such is to be employed. These active-hydrogen-containing components are blended together for a minimum of approximately two (2) hours, whereafter the amine catalyst is added to obtain a proper gel time as set forth elsewhere herein with respect to "quality control specifications", particularly in the Examples. The drying agent may be obviated by heating the resin blend of polyol and diol components to approximately 100° C. and applying a vacuum to eliminate water from the system. The resultant polyol and diol blend, or resin component blend, is then admixed with (A) a polymeric diisocyanate, such as PMDI, in approximately stoichiometric proportions with respect to the total quantity of diols and polyols present in the resin component blend, the isocyanate index generally being between about 1.0 and 1.2. The blending can be accomplished by hand or more expeditiously in a usual mixing machine. The resinous polyurethane product is then open cast, poured into an extrusion having an aperture provided therefor, or applied in a spray, or RIM (reinforced or unreinforced reaction molding) application, thus being adapted for the production of a wide variety of end-use parts and applications.

The two-component mixture involved can be used as a purely liquid system, or filled with standard fillers or fibers, or applied together with chopped fiber or fiber matting materials, but such fillers and fibers are not necessary for the attainment of satisfactory and advantageous properties and characteristics in the cast and cured polyurethane elastomer. The application temperature may range from about 70° F. to about 150° F., depending upon the intended application. The product cures by standing at room temperature or above, generally up to about 180° F., at which temperature the product is completely stable. The product rapidly attains satisfactory hardness characteristics and is generally allowed to cool in an approximately 77° F. environment for a one-week period to obtain its final advantageous properties and characteristics, as will be seen from the product test characteristics and data presented elsewhere herein.

Relative Proportions of Ingredients

For the diol and polyol resin-forming component, the relative proportions of polyol (B), polyether diol or triol (C), and the glycol (D) are respectively about 35 through about 45 parts by weight of (B), about 35 through about 45 parts by weight of (C), and about 12 through about 20 parts by weight of (D), per 100 parts by weight of all diol and polyol components, sometimes referred to herein as the "resin component", and this resin component may and generally does include about 1% to about 3% of drying agent when employed, as well as about 1% to about 5% of a urethane-catalyst, preferably a polyurethane-catalyzing amount of an amine and especially a diamine, e.g., a triethylenediamine, urethane catalyst, and the preferred proportions are in the range of about 40–43 parts of (B), 38–41 parts of (C), and 15–17 parts of (D), all per 100 parts by weight of all diol and polyol components comprising the "resin component" of the two-component system of the present invention, comprising all of the polyol and diol components and excluding only the isocyanate component which is ultimately admixed therewith.

DETAILED DESCRIPTION OF THE INVENTION

Description of the Preferred Embodiments

The invention will be more fully understood by reference to the following examples, which are given by way of illustration only and are not to be construed as limiting. The parts and percentages given therein are by weight unless otherwise specified.

EXAMPLE 1

Drying Agent

The production blend for a twelve-drum batch is as follows:

Two thousand, two hundred and thirty eight (2,238) pounds of polyether diol, having a molecular weight of 1000, an OH functionality (primary hydroxyls) of 2, and a hydroxy number of 112 (Olin-Poly-G ® 55-112) is added to a clean blending tank at 77° F. (25° C.). Next, 2,356 pounds of propylene oxide-extended methyl glucoside having an average of about 1.5 propylene oxide units per hydroxy group, a molecular weight of about 446, an OH-functionality of about 3.5, and a hydroxy number of about 440 (Olin-Poly-G ® 75-442) is added at 77° F. (25° C.) and the two are allowed to mix to homogeneity over a period of one hour.

To this mixture 883 pounds of dipropylene glycol (Dow) and 58 pounds of molecular sieve drying agent (Purmo ® 3ST, a 3 Angstrom pore size zeolite powder from Zeochem) are added at 77° F. These components are then admixed to homogeneity for one hour. Next, 116 pounds of triethylene-diamine catalyst (TEDA-TD-33-Texaco) is added at 77° F. and the blend allowed to mix to homogeneity over a period of two hours.

A sample is taken from the blending tank and the percent of water content, gel time, and other quality control specifications are measured to ensure product consistency. The water content was thus below 0.01%, the gel time was 40 seconds plus or minus one-half second by hand mixing and 35 seconds by machine mixing, and the other quality-control specifications were: viscosity 400cps plus or minus 100cps and a specific gravity of 1.070 plus or minus 0.004.

The resultant resin component blend is then admixed with polymeric MDI through a mechanical metering device. The polymeric MDI (Mondur MR ®-Mobay), i.e., (4,4'-diphenyl-dimethylene-diisocyanate), is mixed at 91 parts by weight of MDI to 100 parts by weight of the polyol blend. The temperature of both chemical constituents is about 77° F. at the time of mixing.

The reaction mixture is poured or cast into a mold or cavitied metal extrusion with an initial temperature of 77° F. The mixture reacts exothermically and forms a solid thermoset polyurethane cast elastomer in 35 seconds. Its hardness measures as follows: Shore A in five minutes 85 plus or minus 2 and Shore D in one hour 82 plus or minus 2. The molded part, or metal part comprising the poured-in-place polyurethane polymer, is allowed to cool in a 77° F. environment for a one-week period to obtain its final properties.

The final properties of the cured product are as set forth under "Product Properties and Characteristics".

EXAMPLE 2

Vacuum—No Drying Agent

An alternative to the previous production run is as follows:

Two thousand, two hundred and sixty-two (2,262) pounds of polyether diol (55-112) is added to a clean blending tank at 100° F. Next, 2,380 pounds of methyl glucoside based polyol (75-442) and 892 pounds of dipropylene glycol are added at 100° F. and these are allowed to mix to homogeneity over a period of one hour.

The blend is heated to 220° F. (Ca. 105° C.) under vacuum and constant blending for two hours to drive off water. Then vacuum is released, the temperature decreased, and 117 pounds of TD-33 triethylenediamine catalyst is added at 100° F. The reaction mixture is then allowed to mix to homogeneity over a period of one hour.

A sample is taken from the blending tank and the percent of water content, gel time, and other quality control specifications are measured to ensure product consistency. The water content was thus below 0.01%, the gel time was 40 seconds plus or minus one-half second by hand mixing and 35 seconds by machine mixing, and the other quality-control specifications were: viscosity 400cps plus or minus 100cps and a specific gravity of 1.070 plus or minus 0.004. The resultant blend is then admixed with polymeric MDI through a mechanical metering device. The polymeric MDI is mixed at 91 parts by weight of MDI to 100 parts by weight of the polyol blend. The initial temperature of both chemical constituents is 77° F.

The mixture is poured into a mold or cavitied metal extrusion with an initial temperature of 77° F. The mixture reacts exothermically and forms a solid thermoset polyurethane elastomer in 35 seconds. The molded part, or metal part, is allowed to cool in a 77° F. environment for a one-week period to obtain its final properties.

The final properties of the cured product are as set forth under "Product Properties and Characteristics".

EXAMPLE 3

Accelerated aging or post-cure at 180° F. for four (4) hours

A second alternative to the production run of Example 1 is as follows:

Two thousand, two hundred and thirty-eight (2,238) pounds of polyether diol (55-112) is added to a clean blending tank at 100° F. Next, 2,356 pounds of methyl glucoside based polyol (75-442), 883 pounds of dipropylene glycol at 100° F., and 58 pounds of drying agent (3A powder) are added. These components are mixed over a period of one hour to homogeneity. Next, 116 pounds of triethylenediamine catalyst (TD-33) is added at 100° F. and the components allowed to mix to homogeneity over a period of one hour.

A sample is then taken from the blending tank and quality control parameters are measured to ensure product consistency. The water content was thus below 0.01%, the gel time was 40 seconds plus or minus one-half second by hand mixing and 35 seconds by machine mixing, and the other quality-control specifications were: viscosity 400cps plus or minus 100cps and a specific gravity of 1.070 plus or minus 0.004. The resultant blend is mixed with polymeric MDI through a mechanical metering device. The polymeric MDI is mixed at 91 parts by weight of MDI to 100 parts by weight of the polyol or resin blend. The initial temperature of both chemical constituents is 77° F.

The mixture is poured into a mold or cavitied metal extrusion at an initial temperature of 77° F. The mixture reacts exothermically and forms a solid polyurethane elastomer in 35 seconds. The molded part, or cavitied metal extrusion comprising the cast polymer, is then placed in a 180° F. environment for four (4) hours. The part or extrusion is then removed and allowed to cool in a 77° F. environment for one week to obtain its final properties.

The final properties in the cured product are as set forth under "Product Properties and Characteristics".

EXAMPLE 4

Preferred Proportions and Ingredients

Following the procedure of Examples 1 and 3, the following diol and triol or resin component was prepared and admixed with polymeric MDI to homogeneity:

| PARTS | |
|---|---|
| 41.68 | 75-442 - methyl glucoside-based polyol |
| 39.60 | 55-112 - polyether diol |
| 15.63 | dipropylene glycol |
| 1.03 | zeolite molecular sieve drying agent-3 Angstrom pore size |
| 2.06 | TD-33 - triethylenediamine catalyst |
| 100.00 | |

Polymeric MDI (diphenylmethanediisocyanate) - to an NCO/OH ratio of 1.04/1 (91 parts)

Further processing was in accord with Example 1.

The product of this system withstood the 450° F. temperature test without degradation and had the same advantageous characteristics as set forth for the products of Examples 1, 2, and 3 under the heading "Product Properties and Characteristics".

EXAMPLE 5

Polyether Polyol (C) Variation

In an additional example following the procedure of Example 1, 42.20 parts of Olin-Poly-G ® 75-442, 40.10 parts of PPG 55-28 (a high performance polyether diol having both propylene oxide and ethylene oxide capping, with approximately 60% ethylene oxide terminal capping, and a hydroxy number of approximately 28), and 15.82 parts of dipropylene glycol, 1.04 parts of 3A zeolite molecular sieve powder, and 84 parts of TD-33 triethylenediamine catalyst, were admixed and, after reaching homogeneity, admixed with 80 parts of polymeric MDI (Mondur M ®—Mobay).

Further processing was in accord with Example 1.

The properties of the product of this Example are provided under the heading "Product Properties and Characteristics".

EXAMPLE 6

Polyether Polyol (C) Variation

In another run following the same procedure as set forth in Example 1, 42.20 parts of methyl glucoside-based polyol Olin-Poly-G ® 75-442, 40.10 parts of Olin-Poly-G ® 85-36 polyether polyol containing 65-70% primary hydroxy groups, having an average molecular weight of 4500 and a hydroxy number of 36, 15.82 parts of dipropylene glycol, 1.04 parts of 3A molecular sieve zeolite drying agent in powder form, and 84 parts of TD-33 triethylenediamine catalyst, were admixed and allowed to come to homogeneity, whereafter 83 parts of polymeric MDI (Mondur MR ®—Mobay) were admixed therewith and the mixture again allowed to come to homogeneity.

Further processing was in accord with Example 1.

The properties of the product produced in this manner are included under the heading "Product Properties and Characteristics".

EXAMPLE 7

Polyol (B) Variation

Example 1 is repeated, substituting UCC Niax ® LS 490 or Texaco RS-490 (a sorbitol-based polyester having a hydroxy number of 490, an OH-functionality of about 4, a molecular weight of about 458, and an equivalent weight of about 122.5) or Olin-Poly-G 75-300 ® (a propyleneoxide-extended—with ca. 2.5 propyleneoxide groups per hydroxy group—methyl glucoside having a hydroxy functionality of 3.5, an equivalent weight of 187, a hydroxy number of 300, and a molecular weight of 655) for the Olin-Poly-G 75-442 ® of Example 1, with similar but not quite as outstanding results.

EXAMPLE 8

Diol (D) Variation

Substitution of DEG in the procedure of Examples 1 or 6 instead of DPG produces nearly equivalent results, with a slight drop in HDT and Izod characteristics.

Product Properties and Characteristics

The following tests were employed in a determination of physical properties where the same are reported in this application:

| Tensile Strength | ASTM D638 |

| | -continued | |
|---|---|---|
| Elongation at Break | DIN 53455 | |
| Modulus of Elasticity | DIN 53455 | |
| Impact Strength | DIN 53455 | |
| Notched Izod | ASTM D256 | |
| Heat distortion temperature @ 66 psi (HDT) | ASTM D648 | |

In the following tests, the cast polyurethane elastomers were post-cured in the identical manner, either by accelerated aging at 180° F. for four (4) hours, or by post-cure for seven (7) days at 22° C./72° F., both standard cures for comparison of properties. Tests are performed at 77° F. Values of competitive materials, unless otherwise indicated, were taken from competitor information sheets.

| | EXAMPLES 1-4 | EXAMPLE 5 | EXAMPLE 6 |
|---|---|---|---|
| Izod | 1.40 | 1.03 | 1.10 |
| Tensile | 10,500 | 8,000 | 8,500 |
| Elongation | 10% | 18% | 12.5% |
| HDT | 184° F. | 190° F. | 195° F. |
| Debridge Time | 15 min. | 15 min. | 15 min. |
| Application Life | ½ min. | 1½ min. | 2 min. |

The debridge time is the time required for the product to reach 65 Shore D hardness using a Rex Durometer ™.

The application life is the time from when the product is mixed until it becomes solid, using a standard applications machine such as the Polymeter ™.

The HDT (heat distortion temperature) test is only one important temperature test which must be passed (no distortion at a temperature of at least 180° F. by ASTM D648) for the product to be satisfactory for its intended applications. A more important temperature test is temperature stability at 450° F./232° C. for twenty (20) minutes without visual degradation or degassing of the polymer, as evidenced by bubble emission or ebullition. All of the foregoing products also passed this stringent temperature-stability test (after accelerated aging at 180° F. for four (4) hours or by post-curing for seven (7) days at 22° C./72° F.).

Comparative Data

| Competitive PU Cast Elastomer Systems | | | | | |
|---|---|---|---|---|---|
| | A | B | C | D | Previous Standard In-House System (E) |
| Izod | 1.2 | 1.0 | 2.1 | 2.3 | 2.0 |
| Tensile | 9,000 | 3,400 | 6,600 | 5,100 | 5,500 |
| Elongation | 18% | 55% | 20% | 30% | 20%+ |
| HDT | 149° F. | — | — | 158° F. | 153° F. |
| Debridge Time | 2 hrs. | 2 hrs. | ½ hr. | 5 min. | 10 min. |
| Application Life | 2 min. | 2 min. | 1 min. | 10 sec. | 12 sec. |

A = PRC PR-453
B = Fuller UR-2121
C = Morton-Thiokol 200
D = PRC PR 440F

The foregoing competitive product A, as well as E, degraded in the 450° F./232° C. temperature stability test.

Commercial Product

A commercial product was realized in accord with the foregoing disclosure and Examples 1-4 under the trivial designation "SU-205". The following outlines some properties and characteristics of the commercial product, which exceed the performance parameters of any known castable polyurethane elastomer used in the manufacture of thermal barrier window and door extrusions.

The following properties and characteristics were obtained on the cast thermoset product either after accelerated aging or post-cure at 180° F. for four (4) hours as in Example 3, or by post-curing for seven (7) days at 22° C./72° F.

| Tensile | | 10,800 p.s.i. | |
|---|---|---|---|
| Elongation | | 13% | |
| Heat Distortion | | 189° F. | |
| Modulus of Elasticity | | 400,000 lbs (approximately) 214-220,000 lbs is normal) | |
| Impact | | 1.23 ft/lbs | |
| PHYSICAL CONSTANTS | | | |
| Color | | | Clear Amber |
| Specific Gravity | | | 1.070 |
| Weight/gal | | lb/gal | 8.89 |
| Viscosity | | cps/mPa · s | 400 ± 100 |
| PERFORMANCE CHARACTERISTICS | | | |
| Gel Time (100 gram sample) | @ 77° F./25° C. | | 2 min. ± 10 sec. |
| Hardness (ASTM 2240) | @ 72° F./22° C. | Shore A (5 min.) | 85 ± 2 |
| | @ 72° F./22° C. | Shore D (1 hr.) | 82 ± 2 |
| Debridging Time | @ 72° F./22° C. | | 20 minutes |

To repeat, the performance parameters of the commercial product of the present invention exceed the performance parameters of any known castable polyurethane elastomer used in the manufacture of thermal barriers, especially in thermal barrier window and door extrusions.

It is therefore seen that an improved and highly advantageous thermosetting castable polyurethane polymer of elastomer, suitable for all of its intended purposes and uses, and having improved heat-stability characteristics, is provided by the present invention, with all of its attendant advantages in use.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

I claim:

1. A thermosetting castable polyurethane polymer having improved heat-stability characteristics, comprising:
    (A) a polymeric methylene diisocyanate having a functionality of at least about 2;
    (B) a polyol having a molecular weight between about 300 and about 900 and an OH-functionality between about 3.0 and about 6.0;
    (C) a polyether diol or triol having a molecular weight between about 500 and about 4000 and an OH-functionality between about 1.8 and about 3.2;
    (D) a glycol selected from dipropylene glycol and diethylene glycol having a molecular weight between about 100 and 200 and an OH-functionality between about 1.8 and about 2.2;

said constituent diols and polyols being in the proportion of about 35 through about 45 parts by weight of (B), about 35 through about 45 parts by weight of (C), and about 12 through about 20 parts by weight of (D), per 100 parts by weight of all diol and polyol components;

(E) an effective polyurethane-catalyzing amount of a urethane catalyst; and (F) the isocyanate component (A) and combined diol and polyol components (B), (C), and (D), being in proportions so as to provide an NCO/OH ratio to at least about 1:1.

2. A castable polyurethane composition of claim 1, wherein the polyol (B) comprises an alkylene oxide extended polyol having a molecular weight between about 400 and 500 and a hydroxy number between about 300 and 450.

3. A castable polyurethane composition of claim 2, wherein the polyether diol or triol (C) has a molecular weight of about 750–1000 and a hydroxy number between about 100 and 150.

4. A castable polyurethane composition of claim 3, wherein (D) comprises dipropylene glycol.

5. A castable polyurethane composition of claim 1, wherein the polyol component (B) comprises a sugar-based alkylene oxide extended polyol.

6. A castable polyurethane composition of claim 5, wherein the polyol component (B) comprises an alkylene oxide extended alkyl glucoside.

7. A castable polyurethane composition of claim 6, wherein the polyol component (B) comprises a propylene oxide extended methyl glucoside having a molecular weight of about 446 and a hydroxy number of about 440.

8. A castable polyurethane composition of claim 1, wherein the catalyst (E) comprises an amine catalyst.

9. A castable polyurethane composition of claim 1, wherein the catalyst (E) comprises a diamine catalyst.

10. A castable polyurethane composition of claim 1, wherein the NCO/OH ratio is between about 1:1 and about 1.2:1.

11. A castable polyurethane composition of claim 1, comprising an effective amount of a drying agent.

12. A castable polyurethane composition of claim 11, comprising a molecular sieve drying agent in an effective amount between about 1 and about 3 percent by weight of resin component.

13. A castable polyurethane composition of claim 12, wherein the drying agent comprises a zeolite.

14. A castable polyurethane composition of claim 1, wherein the polymeric diisocyanate comprises polymeric MDI (4,4'-diphenyl-dimethylene-diisocyanate).

15. A castable polyurethane composition of claim 7, wherein the polymeric diisocyanate comprises polymeric MDI (4,4'-diphenyl-dimethylene-diisocyanate).

16. A castable polyurethane composition of claim 1, wherein component (B) comprises a propylene oxide extended methyl glucoside having a molecular weight of about 446 and having a hydroxy number of about 440, component (C) comprises a polyether diol having a molecular weight of about 750–1000 and a hydroxy number of about 112, and component (D) comprises dipropylene glycol.

17. A castable polyurethane composition of claim 16, wherein the amount of component (B) is about 40–43 parts, the amount of component (C) is about 38–41 parts, and the amount of component (D) is about 15–17 parts, per 100 parts by weight of all diol and polyol components.

18. A castable polyurethane composition of claim 17, wherein component (A) comprises polymeric MDI (4,4'-diphenyl-dimethylene-diisocyanate), the catalyst comprises a triethylene diamine catalyst, and the drying agent comprises a zeolite.

19. A castable polyurethane composition of claim 18, wherein the NCO/OH ratio is between about 1.05 and about 1.13:1.

20. A poured and cured cast polyurethane composition of any of claims 1 through 19.

21. A poured and cured cast polyurethane composition of any of claims 1 through 19 which is temperature stable in the ASTM D648 heat distortion test at a temperature of 180° F.

22. A poured and cured cast polyurethane composition of any of claims 1 through 19 which is temperature stable at a temperature of 450° F./232° C. for twenty minutes without visual degradation.

* * * * *

UNITED STATES PATENT AND TRADEMARK OFFICE
CERTIFICATE OF CORRECTION

PATENT NO.  : 5,130,404
DATED       : Jul. 14, 1992
INVENTOR(S) : Gerard S. Freeland It is certified that error appears in the above-identified patent and that said Letters Patent is hereby corrected as shown below:

Column 3, line 49; "alia. singly" should read -- alia, singly --.
Column 9, line 58; "(Purmo R" should read --(Purmol R --.
Column 12, approximately line 12; "84" should read -- .84 --.
Column 12, approximately line 30; "84" should read -- .84 --.
Column 14, line 40; "of" should read -- or --.

Signed and Sealed this

Seventeenth Day of August, 1993

*Attest:*

BRUCE LEHMAN

*Attesting Officer*   Commissioner of Patents and Trademarks